United States Patent
Januszewski et al.

(10) Patent No.: US 11,064,517 B2
(45) Date of Patent: Jul. 13, 2021

(54) OPTIMIZATION OF SIGNALLING OF ABSOLUTE GRANTS FOR UPLINK TRANSMISSION USING TIME-DIVISION MULTIPLEXING

(71) Applicant: Nokia Solutions and Networks Oy, Espoo (FI)

(72) Inventors: Maciej Januszewski, Pila (PL); Michal Panek, Wroclaw (PL); Karri Markus Ranta-Aho, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/889,479

(22) PCT Filed: May 8, 2013

(86) PCT No.: PCT/EP2013/059565
§ 371 (c)(1),
(2) Date: Nov. 6, 2015

(87) PCT Pub. No.: WO2014/180500
PCT Pub. Date: Nov. 13, 2014

(65) Prior Publication Data
US 2016/0088653 A1    Mar. 24, 2016

(51) Int. Cl.
| | | |
|---|---|---|
| *H04W 72/14* | (2009.01) | |
| *H04W 72/12* | (2009.01) | |
| *H04W 28/02* | (2009.01) | |
| *H04L 5/00*  | (2006.01) | |
| *H04W 72/04* | (2009.01) | |
| *H04W 74/00* | (2009.01) | |

(52) U.S. Cl.
CPC .......... *H04W 72/14* (2013.01); *H04L 5/0098* (2013.01); *H04W 28/0205* (2013.01); *H04W 72/042* (2013.01); *H04W 72/1268* (2013.01); *H04W 74/006* (2013.01)

(58) Field of Classification Search
CPC .................................................. H04W 28/0205
See application file for complete search history.

(56) References Cited

U.S. PATENT DOCUMENTS

| | | | | |
|---|---|---|---|---|
| 10,491,335 B2* | 11/2019 | Rudolf | ................. | H04L 1/1678 |
| 2006/0114877 A1* | 6/2006 | Heo | ..................... | H04L 1/0029 |
| | | | | 370/342 |

(Continued)

FOREIGN PATENT DOCUMENTS

| | | |
|---|---|---|
| EP | 2 408 246 A1 | 1/2012 |
| EP | 2 448 320 A1 | 5/2012 |
| KR | 2007 0094443 A | 9/2007 |

OTHER PUBLICATIONS

3GPP TS 25.319 VII.6.0; "3rd Generation Partnership Project; Technical Specification Group Radio Access Network; Enhanced uplink; Overall description; Stage 2 (Release 11)"; Dec. 2012; whole document (87 pages), pp. 51-60: Section 9.

(Continued)

*Primary Examiner* — Kevin M Cunningham
(74) *Attorney, Agent, or Firm* — Harrington & Smith

(57) ABSTRACT

It is provided a method including setting a grant for an uplink transmission to zero if a received absolute grant is not intended for an apparatus performing the method.

21 Claims, 2 Drawing Sheets

(56) References Cited

U.S. PATENT DOCUMENTS

2007/0237266 A1* 10/2007 Reial ................ H04B 1/70755
375/341
2010/0130219 A1   5/2010 Cave et al.
2011/0103326 A1*  5/2011 Kim .................. H04L 1/1812
370/329
2011/0110337 A1   5/2011 Grant et al.
2014/0307644 A1* 10/2014 Kwong ............... H04L 5/0005
370/329

OTHER PUBLICATIONS

Nokia Siemens Networks; "Considerations on efficient TDM scheduling"; R1-132519; 3GPP TSG-RAN WG1 Meeting #73; Fukuoka, Japan, May 20.24, 2013; whole document (4 pages).
Ericsson; "New Study Item proposal: Study on Further EUL Enhancements"; RP-122019; 3GPP TSG Meeting #58; Barcelona, Spain, Dec. 4-7, 2012; whole document (6 pages).
3GPP TS 25.214 V11.5.0 (Feb. 2013); $3^{rd}$ Generation Partnership Project; Technical Specification Group Radio Access Network; Physical layer procedures (FDD) (Release 11); Feb. 2013; whole document (127 pages).

* cited by examiner

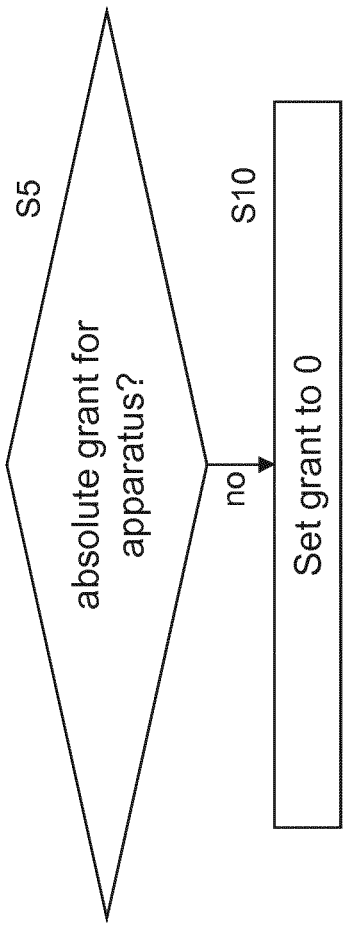
Fig. 2
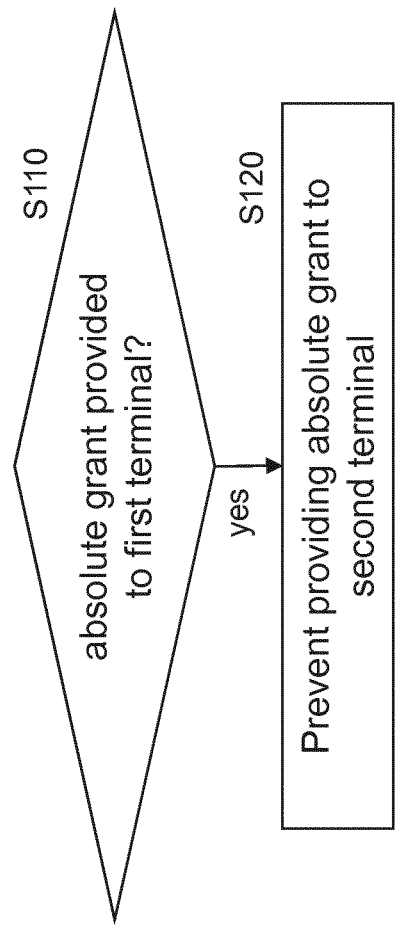
Fig. 4
Fig. 1
Fig. 3

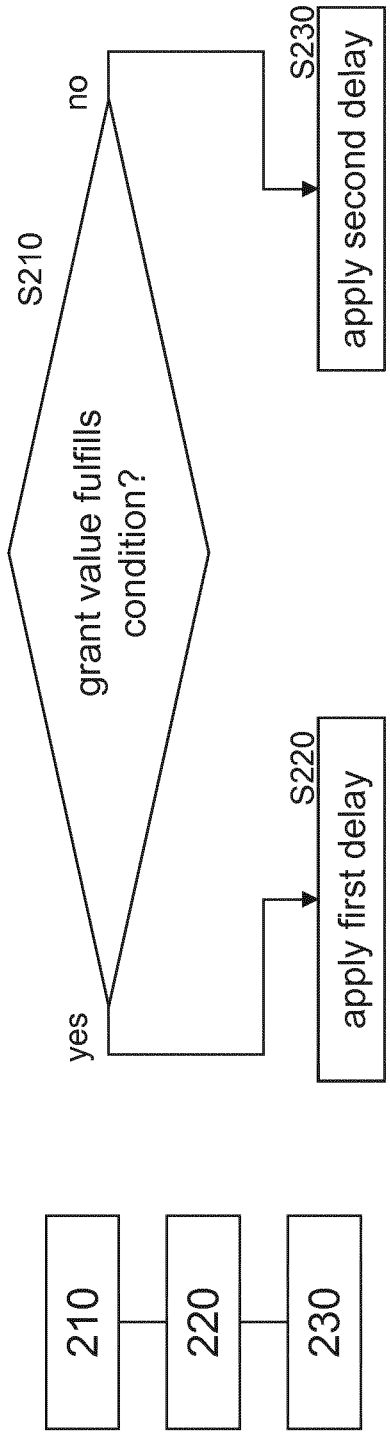
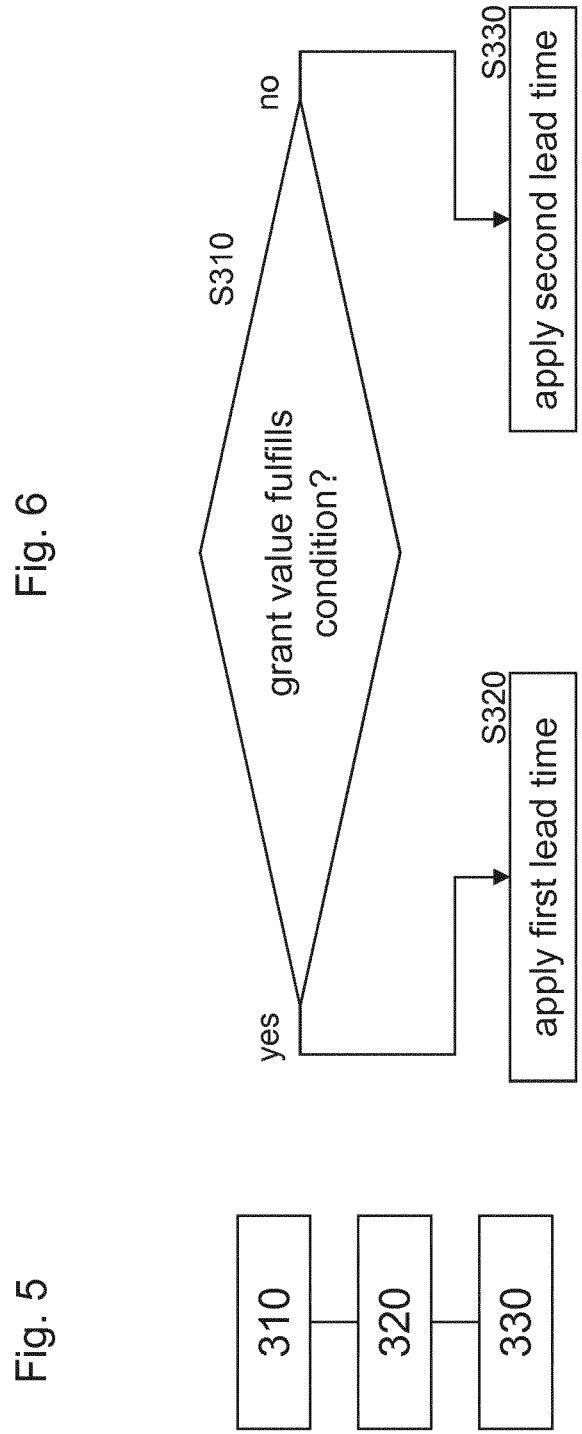

OPTIMIZATION OF SIGNALLING OF ABSOLUTE GRANTS FOR UPLINK TRANSMISSION USING TIME-DIVISION MULTIPLEXING

FIELD OF THE INVENTION

The present invention relates to an apparatus, a method, a system, and a computer program product related to Wideband Code Division Multiple Access (WCDMA) transmission in the Uplink (UL) direction, especially the High Speed Uplink Packet Access (HSUPA) subsystem. More particularly, the present invention relates to an apparatus, a method, a system, and a computer program product for uplink grant procedure in 3GPP WCDMA transmission.

BACKGROUND OF THE INVENTION

Abbreviations

3GPP 3$^{rd}$ Generation Partnership Project
CRC Cyclic Redundancy Check
DPCCH Dedicated Physical Control Channel
eNB Evolved Node B
E-AGCH Enhanced Absolute Grant Channel
E-DCH Enhanced Dedicated Channel
E-DPDCH Enhanced Dedicated Physical Data Channel
E-RGCH Enhanced Relative Grant Channel
E-RNTI E-DCH RNTI
EUL Enhanced Uplink
E-UTRAN Evolved UTRAN
FDD Frequency Division Duplex
GSM Global System for Mobile Communication
HSUPA High Speed Uplink Packet Access
LTE™ Long Term Evolution
LTE-A™ Long Term Evolution-Advanced
OVSF Orthogonal Variable Spreading Factor
RNTI Radio Network Temporary Identifier
RoT Rise over Thermal
RX Receive
SFN SubFrame Number
SI Study Item
SINR Signal to Interference and Noise Ratio
TDM Time Division Multiplex
TS Technical Specification
TTI Transmission Timing Interval
TX Transmit
UE User Equipment
UL Uplink
UMTS Universal Mobile Telecommunication System
UTRAN UMTS RAN
WCDMA Wideband Code Division Multiplex Access
WiFi™ Wireless Fidelity In 3GPP, the work on Study Item on Further EUL enhancements [RP-122019 New SI proposal: Study in Further EUL Enhancements] is active, with many companies contributing their ideas. Contributions in the area of Time Division Multiplexing (TDM) for HSUPA are expected, however no concrete proposals were published yet. TDM scheduling is known to be useful in UL WCDMA as the influence of Multiple Access interference is limited since substantially only one UE transmits at a time. TDM scheduling might be a good extension for a SINR-based scheduling concept as proposed by Nokia Siemens Networks, improving the obtained results.

In the context of WCDMA, TDM describes a situation in which one selected UE in a given cell consumes most of the Noise Rise over Thermal Noise (RoT) resources by transmitting with high data rate for a short period of time (several TTIs—several tens/hundreds of TTIs) while at the same time other UEs either stop their transmission or their transmission consumes significantly less resources. Hence, TDM of WCDMA effectively corresponds to a classical TDM system such as GSM although the mechanisms behind are quite different therefrom.

The scheduling in HSUPA is based on "Scheduling Grants", which imposes the E-DPDCH/DPCCH power ratio for a given UE. Grants are sent to the UEs over E-AGCH channel (absolute value of the grant is sent to a given UE) or over E-RGCH channel (relative grants, information on whether the current grant should be increased or decreased). Since E-RGCH carries only gradual grant updates and TDM scheduling requires more dramatic changes, the present application considers the E-AGCH channel.

The time after which the grant issued by NodeB is effective in the UE is described in 3GPP TS 25.214 in chapter 6B.3:

The UE shall first take into account E-DCH control data received in sub-frame j of the E-AGCH frame associated with SFN i in the higher layer procedures which correspond to E-DCH transmission in sub-frame t of the E-DPDCH frame associated with SFN i+s where:

$$s = \left\lfloor \frac{\left\lceil \frac{30j + 100 - (\tau_{DPCH,n}/256)}{30} \right\rceil}{5} \right\rfloor,$$

and $$t = \left\lceil \frac{30j + 100 - (\tau_{DPCH,n}/256) - 150s}{30} \right\rceil.$$

SUMMARY OF THE INVENTION

It is an object of the present invention to improve the prior art. In detail, it is an object to reduce the grant channel overhead and to improve TDM scheduling.

According to a first aspect of the invention, there is provided an apparatus, comprising nullifying means adapted to set a grant for an uplink transmission to zero if a received absolute grant is not intended for the apparatus.

The apparatus may further comprise checking means adapted to check if the received absolute grant is intended for the apparatus; updating means adapted to update the grant for the uplink transmission based on the received absolute grant if the absolute grant is intended for the apparatus.

In the apparatus, the checking means may be adapted to check that the received absolute grant is intended for the apparatus if a cyclic redundancy check performed on the received absolute grant succeeds.

The apparatus may further comprise monitoring means adapted to monitor if the received message is encoded by a predetermined code; wherein the nullifying means may be adapted to set the grant to zero only if the received message is encoded by the predetermined code.

In the apparatus, the predetermined code may be an orthogonal variable spreading factor code.

According to a second aspect of the invention, there is provided an apparatus, comprising nullifying processor adapted to set a grant for an uplink transmission to zero if a received absolute grant is not intended for the apparatus.

The apparatus may further comprise checking processor adapted to check if the received absolute grant is intended for the apparatus; updating processor adapted to update the grant for the uplink transmission based on the received absolute grant if the absolute grant is intended for the apparatus.

In the apparatus, the checking processor may be adapted to check that the received absolute grant is intended for the apparatus if a cyclic redundancy check performed on the received absolute grant succeeds.

The apparatus may further comprise monitoring processor adapted to monitor if the received message is encoded by a predetermined code; wherein the nullifying processor may be adapted to set the grant to zero only if the received message is encoded by the predetermined code.

In the apparatus, the predetermined code may be an orthogonal variable spreading factor code.

According to a third aspect of the invention, there is provided an apparatus, comprising first updating means adapted to update a grant for an uplink transmission based on an absolute grant received at a time of reception at a first predetermined time relative to the time of reception; second updating means adapted to update the grant for the uplink transmission based on the absolute grant at a second predetermined time relative to the time of reception, wherein the second predetermined time is different from the first predetermined time; selecting means adapted to select, based on a value of the absolute grant, one of the first updating means and the second updating means for updating the grant.

In the apparatus, the selecting means may be adapted to select the first updating means if the value of the absolute grant is equal to or less than a predefined threshold or inactive and to select the second updating means if the value of the absolute grant is larger than the predefined threshold.

In the apparatus, the first predetermined time may be one transmission time interval longer than the second predetermined time.

In the apparatus, the absolute grant may comprise a grant of a long term evolution network.

According to a fourth aspect of the invention, there is provided an apparatus, comprising first updating processor adapted to update a grant for an uplink transmission based on an absolute grant received at a time of reception at a first predetermined time relative to the time of reception; second updating processor adapted to update the grant for the uplink transmission based on the absolute grant at a second predetermined time relative to the time of reception, wherein the second predetermined time is different from the first predetermined time; selecting processor adapted to select, based on a value of the absolute grant, one of the first updating processor and the second updating processor for updating the grant.

In the apparatus, the selecting processor may be adapted to select the first updating processor if the value of the absolute grant is equal to or less than a predefined threshold or inactive and to select the second updating processor if the value of the absolute grant is larger than the predefined threshold.

In the apparatus, the first predetermined time may be one transmission time interval longer than the second predetermined time.

In the apparatus according to any of the first to fourth aspects, the absolute grant may comprise a grant of a long term evolution network.

According to a fifth aspect of the invention, there is provided a user equipment, comprising an apparatus according to any of the first to fourth aspects.

According to a sixth aspect of the invention, there is provided an apparatus, comprising monitoring means adapted to monitor if a first absolute grant is provided to a first terminal device; preventing means adapted to prevent providing a second absolute grant to a second terminal device different from the first terminal device if it is monitored that the first absolute grant is provided.

The apparatus may further comprise providing means adapted to provide the first absolute grant to the first terminal device.

The apparatus may further comprise first coding means adapted to encode the first absolute grant by a predetermined code.

In the apparatus, the predetermined code may be an orthogonal variable spreading factor code.

According to a seventh aspect of the invention, there is provided an apparatus, comprising monitoring processor adapted to monitor if a first absolute grant is provided to a first terminal device; preventing processor adapted to prevent providing a second absolute grant to a second terminal device different from the first terminal device if it is monitored that the first absolute grant is provided.

The apparatus may further comprise providing processor adapted to provide the first absolute grant to the first terminal device.

The apparatus may further comprise first coding processor adapted to encode the first absolute grant by a predetermined code.

In the apparatus, the predetermined code may be an orthogonal variable spreading factor code.

According to an eighth aspect of the invention, there is provided an apparatus, comprising first providing means adapted to provide an absolute grant for a grant of an uplink transmission at a first predetermined time relative to an intended time for updating the grant; second providing means adapted to provide the absolute grant at a second predetermined time relative to the intended time, wherein the first predetermined time is different from the second predetermined time; selecting means adapted to select, based on a value of the absolute grant, one of the first providing means and the second providing means for providing the absolute grant.

In the apparatus, the selecting means may be adapted to select the first providing means if the value of the absolute grant is equal to or less than a predefined threshold or inactive and to select the second providing means if the value of the absolute grant is larger than the predefined threshold.

In the apparatus, the first predetermined time may be one transmission time interval longer than the second predetermined time.

According to an ninth aspect of the invention, there is provided an apparatus, comprising first providing processor adapted to provide an absolute grant for a grant of an uplink transmission at a first predetermined time relative to an intended time for updating the grant; second providing processor adapted to provide the absolute grant at a second predetermined time relative to the intended time, wherein the first predetermined time is different from the second predetermined time; selecting processor adapted to select, based on a value of the absolute grant, one of the first providing processor and the second providing processor for providing the absolute grant.

In the apparatus, the selecting processor may be adapted to select the first providing processor if the value of the absolute grant is equal to or less than a predefined threshold or inactive and to select the second providing processor if the value of the absolute grant is larger than the predefined threshold.

In the apparatus, the first predetermined time may be one transmission time interval longer than the second predetermined time.

In the apparatus according to any of the sixth to ninth aspects, the absolute grant may comprise a grant of a long term evolution network.

According to a tenth aspect of the invention, there is provided a base station, comprising an apparatus according to any of the sixth to ninth aspects.

According to an eleventh aspect of the invention, there is provided a method, comprising setting a grant for an uplink transmission to zero if a received absolute grant is not intended for an apparatus performing the method.

The method may further comprise checking if the received absolute grant is intended for the apparatus; updating the grant for the uplink transmission based on the received absolute grant if the absolute grant is intended for the apparatus.

In the method, the checking may comprises that the received absolute grant is intended for the apparatus if a cyclic redundancy check performed on the received absolute grant succeeds.

The method may further comprise monitoring if the received message is encoded by a predetermined code; wherein the grant may be set to zero only if the received message is encoded by the predetermined code.

In the method, the predetermined code may be an orthogonal variable spreading factor code.

According to a twelfth aspect of the invention, there is provided a method, comprising updating a grant for an uplink transmission based on an absolute grant received at a time of reception at a first predetermined time relative to the time of reception; updating the grant for the uplink transmission based on the absolute grant at a second predetermined time relative to the time of reception, wherein the second predetermined time is different from the first predetermined time; selecting, based on a value of the absolute grant, one of the first predetermined time and the second predetermined time for the updating of the grant.

In the method, the selecting may be adapted to select the first predetermined time if the value of the absolute grant is equal to or less than a predefined threshold or inactive and to select the second predetermined time if the value of the absolute grant is larger than the predefined threshold.

In the method, the first predetermined time may be one transmission time interval longer than the second predetermined time.

According to a thirteenth aspect of the invention, there is provided a method, comprising monitoring if a first absolute grant is provided to a first terminal device; preventing providing a second absolute grant to a second terminal device different from the first terminal device if it is monitored that the first absolute grant is provided.

The method may further comprise providing the first absolute grant to the first terminal device.

The method may further comprise encoding the first absolute grant by a predetermined code.

In the method, the predetermined code may be an orthogonal variable spreading factor code.

According to a fourteenth aspect of the invention, there is provided a method, comprising providing an absolute grant for a grant of an uplink transmission at a first predetermined time relative to an intended time for updating the grant; providing the absolute grant at a second predetermined time relative to the intended time, wherein the first predetermined time is different from the second predetermined time; selecting, based on a value of the absolute grant, one of the first predetermined time and the second predetermined time for the providing of the absolute grant.

In the method, the selecting may be adapted to select the first predetermined time if the value of the absolute grant is equal to or less than a predefined threshold or inactive and to select the second predetermined time if the value of the absolute grant is larger than the predefined threshold.

In the method, the first predetermined time may be one transmission time interval longer than the second predetermined time.

In the method according to any of the eleventh to fourteenth aspects, the absolute grant may comprise a grant of a long term evolution network.

The method according to any of the eleventh to fourteenth aspects may be a method of grant timing.

According to a fifteenth aspect of the invention, there is provided a computer program product comprising a set of instructions which, when executed on an apparatus, is configured to cause the apparatus to carry out the method according to any one of the eleventh to fourteenth aspects. The computer program product may be embodied as a computer-readable medium or directly loadable into the apparatus.

According to embodiments of the invention, at least one of the following advantages may be achieved:
grant channel overhead is reduced;
the gain of TDM scheduling is enhanced;
backwards compatibility is ensured.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein FIG. 1 shows an apparatus according to an embodiment of the invention;

FIG. 2 shows a method according to an embodiment of the invention;

FIG. 3 shows an apparatus according to an embodiment of the invention;

FIG. 4 shows a method according to an embodiment of the invention;

FIG. 5 shows an apparatus according to an embodiment of the invention;

FIG. 6 shows a method according to an embodiment of the invention;

FIG. 7 shows an apparatus according to an embodiment of the invention; and

FIG. 8 shows a method according to an embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

TDM scheduling can be realized in the conventional 3GPP WCDMA system. However, the signalling overhead is significant. It is assumed that in the TDM mode the NodeB has to nominate one UE which will transmit for the next period, while another UE transmitting in the previous period has to be informed that it has to stop the transmission. For that 2 commands have to be issued:
 1. E-AGCH with either ZERO, INACTIVE or very low Absolute Grant Value addressing the UE transmitting in the previous period
 2. E-AGCH with Absolute Grant Value for a UE nominated to transmit in the next period. Typically, in TDM mode, the absolute grant value is relatively high.

In this example it is assumed that further UEs in the cell are not transmitting data or transmit low data rates.

After sending the ZERO-grant to currently transmitting UE we lose one TTI (no UE transmitting with high datarate in the next TTI) before the next UE receives and applies new absolute grant because only one absolute grant may be transmitted per TTI. This reduces gains coming from the TDM scheduling.

According to some embodiments of the invention, the signalling overhead is reduced and/or the problem of not utilized TTIs in case of TDM scheduling is solved.

Conventionally, in HSUPA, all active UEs monitor the E-AGCH channel. When a transmission occurs each UE tries to decode the grant message by performing a CRC check with its E-RNTI, which is associated uniquely to each UE in the cell. If a UE successfully decodes the grant it starts the grant update procedure (set their Serving Grant to the value indicated in the grant message).

According to some embodiments of the invention, all other UEs who receive an E-AGCH transmission which is not intended for them (the CRC check fails) automatically set their Serving Grants to zero. This way a single E-AGCH command would provide an absolute grant for one UE and at the same time silence other UEs in a cell.

According to some embodiments of the invention, the E-AGCH for TDM UEs is transmitted using dedicated OVSF code. This ensures that grant signalling to legacy UEs does not interfere with grant signalling for TDM.

Thus, the grant channel overhead is limited and at the same time all advantages coming from the TDM scheduling are facilitated. Also, wasting of resources (specifically E-DPDCH TTIs) due to inefficient grant signaling is avoided.

FIG. 1 shows an apparatus according to an embodiment of the invention. The apparatus may be a terminal device such as a UE, or an element thereof. FIG. 2 shows a method according to an embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises nullifying means 10.

The nullifying means 10 sets a grant for an uplink transmission to zero if a received absolute grant is not intended for the apparatus (S10). That is, if an absolute grant not intended for the apparatus is received, the apparatus is silent on the uplink channel (e.g. E-DCH) for which the absolute grant is received. The checking (S5), whether or not the received absolute grant is intended for the apparatus may be performed by the apparatus, too, or the result of such a check may be received from another apparatus.

FIG. 3 shows an apparatus according to an embodiment of the invention. The apparatus may be a base station device such as an eNB, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises monitoring means 110 and preventing means 120.

The monitoring means 110 monitors if a first absolute grant is provided to a first terminal device (S110). If it is monitored that the first absolute grant is provided, the preventing means 120 prevents providing a second absolute grant to a second terminal device different from the first terminal device. Thus, the signaling overhead is reduced.

According to some embodiments of the invention, it is avoided to lose 1 TTI every time when the scheduled UE changes in the TDM mode. In order to avoid this loss, the time after which the grant sent from NodeB is effective depends on the value of the grant. That is, the time when the absolute grant sent from the NodeB becomes effective in the UE is different, depending on whether the absolute grant is ZERO or INACTIVE, or different therefrom. In some embodiments, instead of ZERO or INACTIVE, the distinction criterion may be "equal to or less than a predetermined threshold" (or INACTIVE).

In some embodiments thereof, if the value of the grant is not equal to ZERO (equal to or less than the predetermined threshold) or INACTIVE, the timing is kept as described in 3GPP TS 25.214 v11.5.0:

The UE shall first take into account E-DCH control data received in sub-frame j of the E-AGCH frame associated with SFN i in the higher layer procedures which correspond to E-DCH transmission in sub-frame t of the E-DPDCH frame associated with SFN i+s where:

$$s = \left\lfloor \frac{\left\lceil \frac{30j + 100 - (\tau_{DPCH,n}/256)}{30} \right\rceil}{5} \right\rfloor,$$

and $$t = \left\lceil \frac{30j + 100 - (\tau_{DPCH,n}/256) - 150s}{30} \right\rceil.$$

On the other hand, if the grant value is equal to ZERO (equal to or less than a predetermined threshold) or INACTIVE, the delay is calculated as above, but additional delay is added such that this grant is applied with a different delay than grants where the value does not fulfill the condition for the grant value.

Typically, the additional delay is positive such that a grant where the value fulfills the condition is applied relatively later than other grants not fulfilling the condition. However, in some embodiments, the additional delay may be negative, such that a grant where the value fulfills the condition is applied relatively earlier than other grants not fulfilling the condition. In such a case, it must be ensured that the time for applying the absolute grant is sufficiently long taking into account e.g. propagation time and processing time. "Relatively later" and "relatively earlier" mean relative to the TTI where the absolute grant is received.

Typically, the additional delay is indicated in terms of TTI. In some embodiments, it is 1 TTI. Thus, NodeB may react most flexible because the grants for the UE to become active and for the UE to become silent are provided as closely as possible (with different update timings) relative to each other.

The invention is not limited to the timing according to 3GPP TS 25.214 as timing for the grants with grant values not fulfilling the above condition. For example, grants with grant values fulfilling the condition may be applied with a delay according to 3GPP TS 25.214, and grants not fulfilling the condition may be applied at a different timing. Also, none of the different timings may be that of 3GPP TS 25.214.

FIG. 5 shows an apparatus according to an embodiment of the invention. The apparatus may be a terminal device such as a UE, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises selecting means 210, first updating means 220, and second updating means 230.

The first updating means 220 updates a grant for an uplink transmission based on an absolute grant received at a time of reception at a first predetermined time relative to the time of reception (S220).

The second updating means 230 updates the grant for the uplink transmission based on the absolute grant at a second predetermined time relative to the time of reception (S230). The second predetermined time is different from the first predetermined time. Thus, the first and second updating means correspond functionally to each other except that they apply different delays to the updating of the grant relative to the reception of the absolute grant.

The selecting means 210 selects, based on a value of the absolute grant, one of the first updating means and the second updating means for updating the grant (S210). For example, the selecting means 210 checks if the value of the received absolute grant is equal to or less than a predetermined threshold or inactive. Then, it selects one of the first and second updating means (220, 230) dependent on the result of the check.

FIG. 7 shows an apparatus according to an embodiment of the invention. The apparatus may be a base station device such as an eNB, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises selecting means 310, first providing means 320, and second providing means 330.

The first providing means 320 provides an absolute grant for a grant of an uplink transmission at a first predetermined time relative to an intended time for updating the grant (S320).

The second providing means 330 provides the absolute grant at a second predetermined time relative to the intended time (S330). The first predetermined time is different from the second predetermined time. The first and second predetermined times indicate how long in advance (before the grants should really be updated) the apparatus provides the absolute grant. Thus, the first and second providing means correspond functionally to each other except that they apply different lead times before the updating of the grant.

The selecting means 310 selects, based on a value of the absolute grant, one of the first providing means and the second providing means for providing the absolute grant (S310). For example, the selecting means 310 checks if the value of the absolute grant to be provided is equal to or less than a predetermined threshold or inactive. Then, it selects one of the first and second updating means (320, 330) dependent on the result of the check.

Instead of in LTE or LTE-A, embodiments of the invention may be employed in other radio networks where uplink transmissions are scheduled by base stations, such as CDMA, EDGE, UMTS, WiFi networks, etc. A terminal (device) or a user equipment may be a mobile phone, a smart phone, a PDA, a laptop or any other terminal which may be attached to networks of the respective technologies such as LTE, LTE-A or UMTS. A base station (device) may be any base station of the respective technology such as a NodeB, an eNodeB, an access point, etc., irrespective of its coverage area, such as macro cell, pico cell, femto cell. In particular, in the present application, NodeB and eNodeB are considered to e equivalent to each other if not otherwise stated or clear from the contact.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they are differently addressed. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a terminal device such as a user equipment, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a base station device such as an eNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:
a non-transitory computer readable medium comprising a computer program; and
at least one processor, the computer-readable medium and the computer program configured, with the at least one processor, to cause the apparatus to perform operations comprising:
receiving at the apparatus a grant message comprising an absolute grant intended for at least one terminal device;
checking whether the received absolute grant is intended for the apparatus;
setting a grant for an uplink transmission to zero based on the received absolute grant not being intended for the apparatus;
being silent, based on the grant for the uplink transmission being set to zero, for a next time period on an uplink channel for which the received absolute grant is received, wherein being silent comprises stopping a transmission by the apparatus performed in a time period previous to the next time period;
updating the grant for the uplink transmission to be effective, consistent with either a first predetermined time or a second predetermined time relative to a time of receiving at the apparatus the grant message, based on a value associated with the received absolute grant and based on the received absolute grant being intended for the apparatus; and
updating the grant for the uplink transmission to be effective at the first predetermined time based on the received absolute grant being intended for the apparatus and the value associated with the received absolute grant being equal to or less than a predetermined threshold or inactive, and otherwise updating the grant for the uplink transmission to be effective at the second predetermined time.

2. The apparatus according to claim 1, wherein the checking checks that the received absolute grant is intended for the apparatus based on a cyclic redundancy check performed on the received absolute grant succeeding.

3. The apparatus according to claim 1, wherein the computer-readable medium and the computer program are further configured, with the at least one processor, to cause the apparatus to perform operations comprising:
monitoring whether the received message is encoded by a predetermined code, wherein the setting sets the grant to zero only based on the received message being encoded by the predetermined code.

4. The apparatus according to claim 3, wherein the predetermined code is an orthogonal variable spreading factor code.

5. The apparatus according to claim 1, wherein the absolute grant comprises a grant of a long term evolution network.

6. A user equipment comprising an apparatus according to claim 1.

7. An apparatus comprising:
a non-transitory computer readable medium comprising a computer program; and
at least one processor, the computer-readable medium and the computer program configured, with the at least one processor, to cause the apparatus to perform operations comprising:
providing a first absolute grant, intended for a first terminal device, for an uplink channel to the first terminal device, the first absolute grant associated with a next time period,
wherein reception of the first absolute grant by terminal devices other than the first terminal device is expected to cause those terminal devices to be silent on the uplink channel for at least the next time period, wherein being silent comprises stopping a transmission by any one of the other terminal devices performed in a time period previous to the next time period;
preventing, based on providing the first absolute grant to the first terminal device and for at least the next time period, providing a second absolute grant for the uplink channel to a second terminal device different from the first terminal device;
checking whether a value associated with the first absolute grant is equal to or less than a predetermined threshold or inactive; and
providing the first absolute grant at a first predetermined time based on the value of the first absolute grant being equal to or less than the predetermined threshold or inactive, where the first predetermined time corresponds to a time in advance the first absolute grant is updated with the first terminal device, otherwise providing the first absolute grant at a second predetermined time, where the second predetermined time corresponds to a time in advance the first absolute grant is updated with the first terminal device.

8. The apparatus according to claim 7, wherein the computer-readable medium and the computer program are further configured, with the at least one processor, to cause the apparatus to perform operations comprising:
encoding the first absolute grant by a predetermined code.

9. The apparatus according to claim 8, wherein the predetermined code is an orthogonal variable spreading factor code.

10. The apparatus according to claim 7, wherein the absolute grant comprises a grant of a long term evolution network.

11. A base station comprising: an apparatus according to claim 7.

12. A method comprising:
receiving at an apparatus a grant message comprising an absolute grant intended for at least one terminal device;
checking whether the received absolute grant is intended for the apparatus;
setting a grant for an uplink transmission to zero based on the received absolute grant not being intended for the apparatus;
being silent, based on the grant for the uplink transmission being set to zero, for a next time period on an uplink channel for which the received absolute grant is received, wherein being silent comprises stopping a transmission by the apparatus performed in a time period previous to the next time period;
updating the grant for the uplink transmission as effective, consistent with either a first predetermined time or a second predetermined time relative to a time of receiving at the apparatus the grant message, based on a value associated with the received absolute grant and based on the received absolute grant being intended for the apparatus; and
updating the grant for the uplink transmission to be effective at the first predetermined time based on the received absolute grant being intended for the apparatus and the value associated with the received absolute grant being equal to or less than a predetermined threshold or inactive, and otherwise updating the grant for the uplink transmission to be effective at the second predetermined time.

13. The method according to claim 12, wherein the checking comprises that the received absolute grant is intended for the apparatus based on a cyclic redundancy check performed on the received absolute grant succeeding.

14. The method according to claim 12, further comprising:
monitoring whether the received message is encoded by a predetermined code, wherein the grant is set to zero only based on the received message being encoded by the predetermined code.

15. The method according to claim 14, wherein the predetermined code is an orthogonal variable spreading factor code.

16. The method according to claim 12, wherein the absolute grant comprises a grant of a long term evolution network.

17. A computer program product comprising a non-transitory computer-readable medium having a set of instructions thereon which, when executed on the apparatus, is configured to cause the apparatus to carry out the method according to claim 12.

18. A method comprising:
providing a first absolute grant, intended for a first terminal device, for an uplink channel to the first terminal device, the first absolute grant associated with a next time period,
wherein reception of the first absolute grant by terminal devices other than the first terminal device is expected to cause those terminal devices to be silent, on the uplink channel for at least the next time period, wherein being silent comprises stopping a transmission by any one of the other terminal devices performed in a time period previous to the next time period;
preventing, based on providing the first absolute grant to the first terminal device and for at least the next time period, providing a second absolute grant for the uplink channel to a second terminal device different from the first terminal device;
checking whether a value associated with the first absolute grant is equal to or less than a predetermined threshold or inactive; and
providing the first absolute grant at the first predetermined time based on the value of the first absolute grant being equal to or less than the predetermined threshold or inactive, where the first predetermined time corresponds to a time in advance the first absolute grant is updated with the first terminal device, otherwise providing the first absolute grant at the second predetermined time, where the second predetermined time corresponds to a time in advance the first absolute grant is updated with the first terminal device.

19. The method according to claim 18, further comprising:
encoding the first absolute grant by a predetermined code.

20. The method according to claim 19, wherein the predetermined code is an orthogonal variable spreading factor code.

21. A computer program product comprising a non-transitory computer-readable medium having a set of instructions thereon which, when executed on an apparatus, is configured to cause the apparatus to carry out the method according to claim 18.

* * * * *